Dec. 15, 1936.  F. A. THOMANN  2,064,394
COTTON HARVESTER
Filed April 25, 1934   2 Sheets-Sheet 1
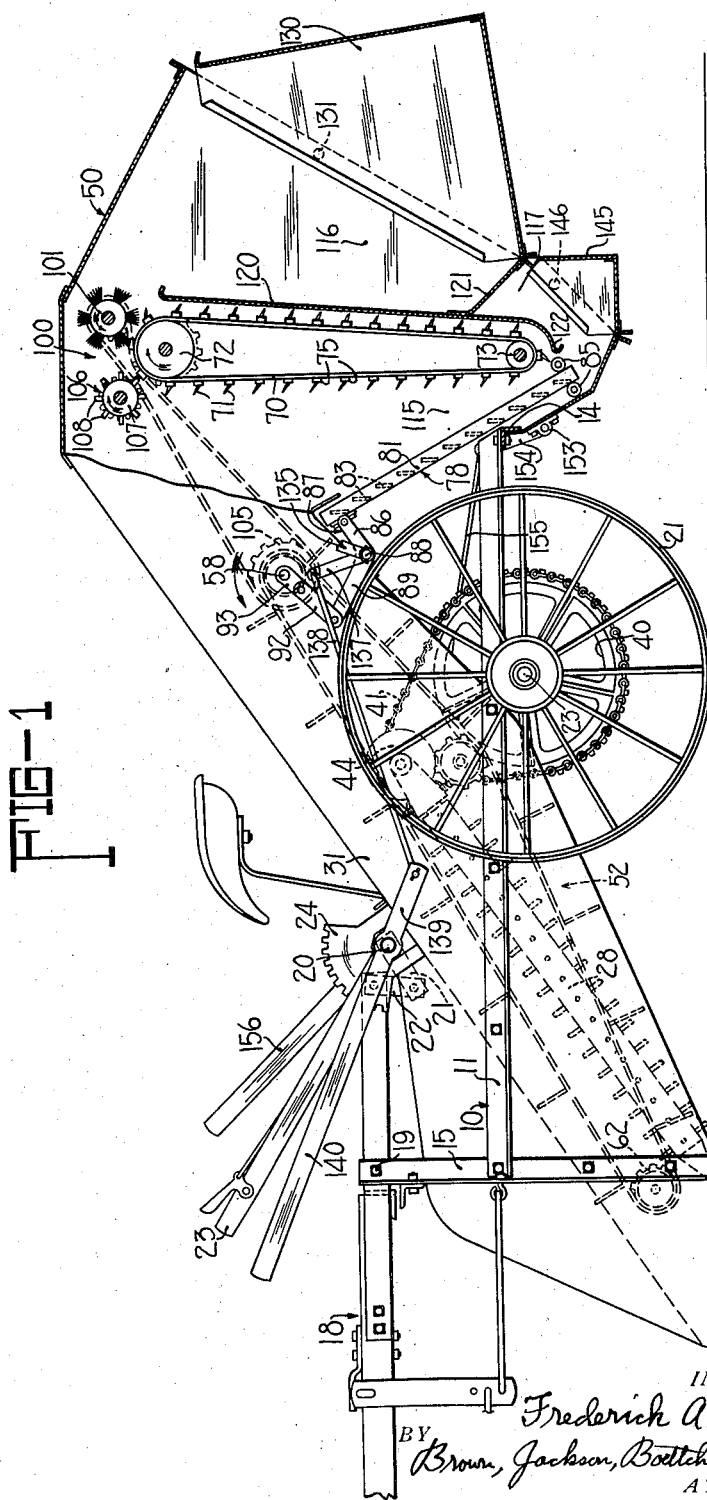

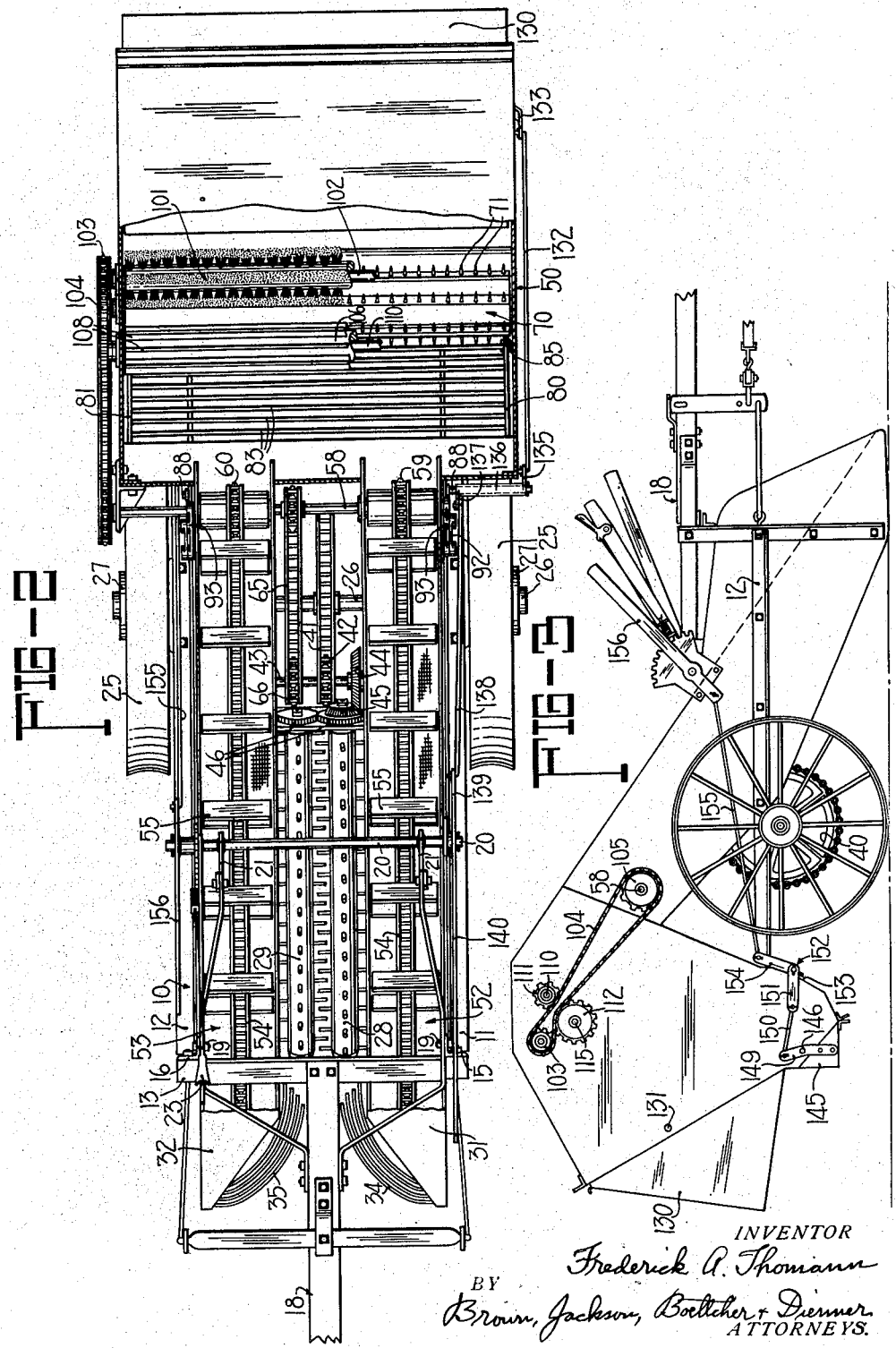

Patented Dec. 15, 1936

2,064,394

UNITED STATES PATENT OFFICE 2,064,394

COTTON HARVESTER

Frederick A. Thomann, East Moline, Ill., assignor to Deere & Company, Moline, Ill., a corporation of Illinois Application April 25, 1934, Serial No. 722,263

19 Claims. (Cl. 56—33)

The present invention relates generally to agricultural implements, more particularly to cotton harvesting machines, and has for its principal object the provision of a machine capable of operating in the fields before the entire crop is ripe and while the foliage is yet green and some of the cotton bolls immature and unopened, and according to the present invention the machine is capable of stripping the cotton plants and separating the larger portion of the green substance, especially the green bolls, from the stripped material in order that the latter may be ginned.

One of the most important factors which must be considered in connection with the development of cotton harvesting machinery is that the fruit is not ripened all at once, but the ripening takes place over a period of several months, and even when the fields are ready for the first picking the plants may be filled with young and immature cotton bolls in various stages of growth. Heretofore, the cotton strippers and harvesters which have been successful have been designed principally for use after the cotton plants are dead and the bolls have become ripened or dry. In those sections of the cotton country where frost occurs, it is usual to wait until after a killing frost, because frost not only kills the foliage but also hastens the ripening and drying of the green bolls, and after this occurs the use of cotton strippers and harvesters is considerably facilitated. There is, however, some risk in waiting until all the cotton is ripened or dry, because the cotton first to ripen will fall on the ground and, if heavy storms occur, much of it will be knocked off the plants and matted on the ground. It has been customary, therefore, to pick the cotton first to ripen by hand and then finish up with a stripper.

In addition, there is another factor in connection with the harvesting of cotton which makes it desirable to wait until the crop is ripened or dry before utilizing any of the machines of the prior art for harvesting the cotton, particularly cotton strippers. The cotton stripper, when operated in plants in which the crop is practically all ripened or dry, as after frost has occurred, will strip a large amount of dry leaves, twigs, and the like from the plants. Cotton gins are usually equipped to handle cotton having dry, foreign matter mixed with it. Therefore, the stripped matter gathered by a cotton stripper operating in a field in which all the cotton is ripened, or in which the foliage and bolls on the plant are dry, can be hauled directly to the gin. Gins, however, are not equipped to handle material having an appreciable amount of green substance in it. The moisture in the green material seriously interferes with the ginning operation, and may also cause moulding and rotting of the cotton lint when baled. Gins will not, therefore, take stripped material containing an appreciable amount of green substance, and for this reason cotton strippers have heretofore not been used in green cotton, that is, in cotton in which the foliage of the plant is still green and in which say 75% of the bolls are matured while the other 25% are still immature, in other words green and unopened.

With the above factors in mind, the present invention contemplates the provision of a machine for harvesting cotton in which, first, it is not necessary to wait until frost has occurred or until practically all of the fruit is ripe or dry and, in which, second, means is provided for separating the cotton harvested into two parts, one dry and matured sufficiently to be effectively ginned and the other part consisting of green and unopened bolls which, it has been found, will further ripen and dry after having been harvested and will produce a fairly good grade of cotton. Specifically, it is an object of the present invention to provide a machine which is capable of going into cotton fields in which all of the crop is not ripe and which includes mechanism that will separate a sufficient quantity of green substance, especially the green bolls, from the stripped material to permit the remaining portions to be taken directly to the gin.

Another object of the present invention is the provision of a machine in the form of a cotton stripper which is capable of successfully handling green cotton and, to this end, the machine is arranged for separating out as much of the green material as possible, especially the green or immature bolls, and it is a further object of the present invention to provide operating means which does not break open or otherwise injure the green bolls during this separating operation, but such green bolls can be allowed to dry and be subsequently broken and ginned to recover the immature cotton therefrom. Prior machines of the stripper type have usually been equipped with separating means which have been arranged to, and have usually been provided with special means for, breaking open all the unopened bolls so that the lint could be extracted therefrom. It is this characteristic in particular that has made prior cotton strippers unsuitable for use in green cotton, since the opening of all of the cotton bolls stripped from the plants resulted in wet and immature cotton lint being mixed with the dry matured cotton lint. According to the present invention, therefore, substantially none of the green bolls are broken or injured and consequently none of the wet immature cotton lint is mixed with the dry matured cotton lint, and this is because the green unopened bolls are separated from the ripened bolls.

Another object of the present invention is the provision of a cotton harvesting machine in which there is provided an oscillatory member in the form of a grate the movements of which, when oscillated, not only directs the stripped material toward the separating mechanism but, at the same time, serves to eject dirt, sand, and other foreign material from the cotton stripped from the cotton plants. Still further, another object of the present invention resides in the means for driving the oscillatory grate from the driving means for the stripping mechanism.

Still further, another object of the present invention is the provision of a generally vertically disposed device for picking up the ripened cotton from the mass of stripped material and discharging the same into the rear portion of the hopper, and a further object of the present invention is the provision of means for directing the stripped material toward such device which, while providing for the discharge of foreign material, such as dirt and the like, also provides for the collection of the green unopened cotton bolls separate from the reception and collection of the ripened cotton separated from the mass of stripped material by said separating means.

These and other objects of the present invention will be apparent from the following description of the preferred structure, taken in conjunction with the accompanying drawings illustrating such structure.

In the drawings:

Figure 1 is a side elevation, certain parts being broken away to facilitate the showing, of a horse drawn cotton harvester in which the principles of the present invention have been embodied;

Figure 2 is a top plan view, also including parts shown in section, of the implement shown in Figure 1; and Figure 3 is a side elevation of the right hand side of the machine, the left hand side of which is shown in Figure 1.

Referring now to the drawings, the reference numeral 10 indicates the frame of the implement which comprises longitudinal bars 11 and 12 connected at their ends by transverse bars 13 and 14, the latter being at the rear of the implement, as best shown in Figure 1. Vertical bars 15 and 16 are connected to the forward ends of the longitudinal bars 11 and 12, and a pole unit 18 is pivotally connected, as at 19, to the upper ends of the vertical bars 15 and 16. A rock shaft 20 is journaled on the frame, as by brackets, and carries arms 21 which are connected by links 22 with the rear end of tongue or pole 18. A lever 23 fixed to the rock shaft 20 and cooperating with a sector 24 carried on the frame 10 serves to raise and lower the front end of the latter. The frame 10 is carried upon a pair of driving wheels 25, and these wheels are carried upon axle means 26 which is driven through suitable ratchet mechanisms 27 by the driving wheels 25.

The implement frame 10 carries suitable stripping mechanism in the form of downwardly and forwardly inclined stripping rolls 28 and 29 suitably journaled for rotation on the frame 10 alongside generally downwardly and forwardly inclined housings 31 and 32, the forward ends of which are flared outwardly and carry curved rods 34 and 35 which serve as rearwardly directed guide fingers cooperating with the flared forward ends of the housings 31 and 32 for guiding cotton plants between the stripping rolls 28 and 29. The fingers 34 and 35 are also useful in directing any loose cotton on the ground toward the stripping means.

The stripping rolls 28 and 29 are rotated in opposite directions through a driving connection with the axle 26. This connection comprises a sprocket 40 fixed on the axle 26 and a driving chain 41 which is trained over the sprocket 40 and a sprocket 42 fixed on a drive shaft 43 which is suitably journaled in the frame 10. A bevel gear 44 is fixed on the shaft 43 and meshes with a bevel gear 45 fixed to the upper end of the shaft supporting the stripping roll 28. The other stripping roll 29 is driven from the stripping roll 28 by means of a pair of intermeshing spur gears 46 fixed onto the ends of the shafts which support the two stripping rolls 28 and 29.

A hopper 50, which will be referred to later in detail, is supported at the rear of the frame 10 on the transverse bar 14 and at the rear ends of the generally longitudinally extending housings 31 and 32. Each of these housing contains suitable conveying mechanism for receiving the cotton and other material stripped from the cotton plants and conveying the same rearwardly to the hopper 50. Preferably, this conveying means takes the form of a flight conveyor 52 disposed in the left hand housing 31 and a flight conveyor 53 disposed in the right hand housing 32. Each of these flight conveyors includes a sprocket chain 54 and paddles 55 which convey the material rearwardly but without injury to any green bolls contained therein. The conveyors are driven by means of a transverse shaft 58 disposed in the upper rear portion of the frame and provided with sprockets 59 and 60 by which the upper portions of the flight elevator chains 54 are supported. The lower portions of these chains are carried on idler sprockets 62, as best shown in Figure 1. The lower run of the conveyors operate along the bottoms of the housings 31 and 32, and the stripping rolls 28 and 29 act to strip cotton from the plants and to deliver the same into the housings 31 and 32, alongside which the rolls 28 and 29 are disposed. The lower run of the conveyors 52 and 53, in moving along the lower portions of the housings 31 and 32, serve to deliver the stripped material into the forward portion of the hopper 50. To this end, the drive shaft 58 for the conveyors is connected by means of a chain 65 with a sprocket 66 fixed on the shaft 43 which, it will be remembered, is driven by the driving chain 41 from the driving axle 23.

The housing 50 contains the mechanism for separating out the ripened cotton from the stripped material, and preferably this mechanism is also arranged to include or cooperate with means for separating out the green and unopened bolls from the remaining portion of the stripped material. This separating means comprises a generally vertically arranged spike belt 70 having spikes or pointed members 71. The upper portion of the spike belt 70 is trained over a roller 72, and the lower portion of the belt 70 is supported on a roller 73. Preferably, the pointed members are supported on slats 75 which are suitably secured to the belt 70, the latter usually being constructed of canvas or similar material. The separating means also includes a downwardly and rearwardly inclined oscillatory grating 78 upon which the conveyors 52 and 53 deposit the material stripped from the plants by the rolls 28 and 29 and deposited in the housings 31 and 32. The oscillatory grating comprises two laterally spaced side members 80 and 81 between which are disposed a series of spaced slats 83. The lower end of the grate 78 is carried between two pairs of rollers 85, one pair being mounted on the lower portion of each side wall of the housing 50. At its upper end the grating 78 is connected to the arms 86 of a pair of bell cranks 87 which are mounted upon stub shafts 88 secured to and extending laterally outwardly from the rear upper portions of the conveyor housings 31 and 32, as best shown in Figure 2. The other arms 89 of the bell cranks 87 are connected by means of links 92 to arms 93 mounted on the ends of the elevator drive shaft 58, as best shown in Figure 1. Through this driving connection with the shaft 58, the grating 78 is reciprocated whenever the machine is in operation.

Suitable doffing mechanism 100 is carried within the housing 50 adjacent the upper portion of the spike belt or elevator 70. This doffing mechanism comprises a doffing brush 101 rotatably mounted within the housing 50 by a shaft 102 which, at one end, carries a sprocket 103 over which is trained a chain 104 which is driven by a sprocket 105 (see Figure 3) secured to the right hand end of the conveyor drive shaft 58. The doffing brush 101 removes the ripe cotton from the spikes 71 and throws the same into the rear portion of the hopper 50. A rotatable beater 106 is provided for removing any foreign material clinging to the cotton which is carried upwardly on the spike belt 70. The beater 106 comprises a drum 107 having a series of vanes 108 projecting outwardly from the periphery of the drum 107. The drum 107 is supported on a shaft 110 the outer end of which carries a sprocket 111 engaged by the driving chain 104 for the doffing brush 101, and by this means both the doffing brush and the rotatable beater are driven at the same time. Likewise, the spike belt 70 is driven from the driving chain 104, and to this end a sprocket 112 is fixed to one end of a shaft 115 upon which the roller 72 is mounted and is engaged by the lower run of the driving chain 104.

The hopper 50 is divided into three sections 115, 116 and 117 by means of a generally vertically disposed transverse intermediate wall 120 and a short rearwardly extended wall 121. The spike belt or elevator 70 is mounted just forward of the vertical transverse intermediate wall 120, and the latter wall has a curved section 122 which partially embraces the roller 73 and lies spaced a short distance from the lower end of the oscillatory grate 78. The green bolls, which are stripped off the plants by the rolls 28 and 29 and conducted rearwardly by the elevators 52 and 53, ride down the grating 78 and fall through the space between the lower end of the grating and the lower end 122 of the intermediate wall 120 and the adjacent portion of the spike belt 70. While the slats 83 are spaced apart a distance sufficient to allow dirt, sand and other foreign material to drop therethrough, the spacing is close enough that the green bolls will not fall through but will ride down the grating and pass between the lower end of the wall 20 and the grate 78, as stated, and will be collected in the lower compartment 117. The cotton which is doffed by the brush 101 is thrown over the upper end of the wall 120 and collected in the hopper section 116.

The hopper sections 116 and 117 are each provided with a pivoted section or dumping hood by which the contents may be ejected. The compartment 116 receiving the ripened cotton is provided with a section 130 which is pivoted, as at 131, to the side walls of the hopper. The section or dumping hood 130 is controlled by a link 132 (Figure 2) which is fastened at its rear end to a bracket 133 fixed to the left side of the pivoted section 130, and the link 132 is connected at its forward end to an arm 135, the lower portion of which is shown in Figure 1. The arm 135 is fixed to a sleeve 136 (Figure 2) which is journaled for rocking movement on the extended stub shaft 88, and the inner end of the sleeve 136 has an arm 137 which is connected by means of a link 138 to the lower end 139 of a dumping lever 140 which is pivotally mounted on the left end of the shaft 20.

The dumping hood for the green boll collector 117 is indicated by the reference numeral 145, and this section is pivoted at 146 on the side walls of the lower portion of the hopper. An arm 149 (Figure 3) is fixed, as by rivets, to one end of the dumping hood 145, and the upper end of the arm is connected by means of a link 150 with one arm 151 of a bell crank 152 supported by bearing means 153 on the forward wall of the hopper 50 adjacent the rear ends of the longitudinal frame bars 11 and 12. The other arm 154 of the bell crank 152 is connected by means of a link 155 with the lower end of a second dumping lever 156 mounted on the right end of the shaft 20. By pulling rearwardly on either of the dumping levers 140 or 156, either of the hopper sections 116 or 117 may be emptied of the contents. It is to be observed that both of these hopper sections have their lower or bottom walls inclined downwardly and rearwardly to facilitate the discharge of the contents therefrom.

While I have shown and described above the preferred structure in which the principles of the present invention have been embodied, it will be apparent that my invention is not to be limited to the specific details shown and described above, but that, in fact, widely different means may be employed in the practice of the broader aspects of my invention.

What I claim, therefore, and desire to secure by Letters Patent is:

1. A harvester for harvesting cotton in which some of the cotton bolls are ripe and some are immature or green, comprising means for stripping the ripe and immature bolls from the cotton plants, means for separating the ripe cotton from the immatured bolls, and receiving means for separately receiving the ripe and immatured bolls.

2. A harvester for harvesting cotton in which some of the cotton bolls are ripe and some are green, said harvester comprising means for stripping substantially all of the bolls from the cotton plants, means for separating the ripe cotton from the green bolls, and means for receiving the green bolls.

3. A harvester for harvesting cotton in which some of the cotton bolls are ripe exposing the lint and some are immature or green, comprising means for stripping cotton plants, means for separating a sufficient amount of green substance including green leaves and immatured bolls from the stripped material to permit the remainder of the stripped material to be ginned, and receiving means for receiving said remainder of the material.

4. A harvester for harvesting cotton in which some of the cotton bolls are ripe and some are immature or green, comprising means for stripping the ripe and immature bolls from the cotton plants, means for separating the ripe cotton from the immatured bolls without substantial injury to the immatured bolls, and receiving means for separately receiving the ripe cotton and immatured bolls.

5. A harvester for harvesting cotton in which some of the cotton bolls are ripe and some are green and comprising means for stripping substantially all of the bolls from the cotton plants, preliminary cleaning and conveying means for receiving the stripped material and conveying both the green and ripened bolls rearwardly, means for separating the ripe bolls from the green bolls, means for receiving the ripened bolls, and means separate therefrom for receiving the immature bolls.

6. A harvester for harvesting cotton including a frame, stripping means for removing the green and ripened bolls from the cotton plants, means for conveying the stripped material rearwardly, a hopper for receiving the stripped material, a device carried within the hopper for removing the ripened bolls therefrom, and an oscillatory grating carried by the hopper for feeding the stripped material to said device.

7. A harvester for harvesting cotton comprising a frame, stripping means carried by said frame and adapted to remove cotton from the cotton plants, a hopper carried by said frame, means for conveying the stripped material from said stripping means to said hopper, a generally vertically disposed device carried by the hopper for removing the opened bolls, and an inclined oscillatory grate for feeding the stripped material toward said vertically disposed device.

8. A harvester for cotton and the like comprising a frame, stripping mechanism carried thereby for stripping the cotton from the plants, a hopper disposed at the rear of said frame and including a generally vertical transverse intermediate wall, a generally vertically disposed endless belt having pointed members carried thereby, a portion of the hopper forward of said intermediate wall comprising a generally downwardly and rearwardly inclined portion, the lower section of which is disposed adjacent the lower portion of the endless belt, whereby the section of said endless belt moving upwardly causes the pointed members carried thereby to engage the opened bolls, and doffing means at the upper portion of said endless belt for removing the cotton from the latter and discharging the same into said hopper rearwardly of said generally vertical transverse wall.

9. A harvester for cotton and the like comprising a frame, stripping mechanism carried thereby for stripping the cotton from the plants, a hopper disposed at the rear of said frame and including a generally vertical transverse intermediate wall, a generally vertically disposed endless belt having pointed members carried thereby, a portion of the hopper forward of said intermediate wall comprising a generally downwardly and rearwardly inclined portion, the lower section of which is disposed adjacent the lower portion of the endless belt, whereby the section of said endless belt moving upwardly causes the pointed members carried thereby to engage the opened bolls, and doffing means at the upper portion of said endless belt for removing the cotton from the latter and discharging the same into said hopper rearwardly of said generally vertical transverse wall, the generally downwardly and rearwardly disposed section of the hopper being spaced from the lower end of said intermediate transverse wall and the lower portion of said endless belt to provide for the discharge of unopened bolls therebetween.

10. A cotton harvester comprising a frame, stripping mechanism carried thereby for stripping cotton from the cotton plants, a hopper carried at the rear of said frame, means for conveying the stripped material from said stripping mechanism to said hopper, a device disposed within said hopper having a plurality of teeth for separating the ripened cotton from the remainder of the material in the hopper, a movable member disposed adjacent the lower portion of said device for feeding the stripped material to the latter, said movable member being spaced from said device a distance to provide for the discharge of unopened bolls therebetween, doffing means for removing cotton from said teeth, a hopper for receiving the cotton, and a hopper for receiving the unopened bolls discharged between said movable member and said device.

11. A cotton harvester comprising a frame, stripping mechanism carried thereby, a hopper at the rear of said frame, means for conveying the stripped material rearwardly to said hopper, a generally vertically disposed endless belt arranged within said hopper, toothed members carried by said belt for picking up cotton from the stripped material, a generally downwardly and rearwardly disposed oscillatory grate arranged forward of said belt and adapted to direct said stripped material toward the latter, said grate providing for the discharge of sand, dirt and the like therethrough and the lower end of said grate being spaced from said belt to provide for the discharge of unopened bolls therebetween, and a hopper disposed to receive said unopened bolls.

12. A cotton harvester comprising a frame, stripping mechanism carried thereby, a hopper carried at the rear of said frame and having separated sections with an opening leading to each of said sections, means for conveying the stripped material to said hopper, and a device for separating the ripe cotton from the green bolls, said device providing for the discharge of the ripe cotton into one hopper section and the green bolls into the other hopper section.

13. A harvester for harvesting cotton comprising a main frame, cotton stripping means carried thereby, means for driving said stripping means, a hopper carried by said frame, means in said hopper for separating out the ripened cotton, an oscillatory grate disposed within said hopper for feeding the stripped material to said device, and means for oscillating said grate from the driving means for said stripping means.

14. A harvester for harvesting cotton comprising a main frame, stripping mechanism carried thereby, a hopper at the rear of the frame, conveying means for conducting the stripped material from said mechanism to said hopper, a device in said hopper for removing the ripened cotton therefrom, an oscillatory slotted grate for directing the stripped material toward said device, means including a transverse shaft journaled for rotation on said frame for driving said conveying means, and means connected with said shaft for oscillating said grate.

15. A harvester for harvesting cotton comprising a main frame, stripping mechanism carried thereby, a hopper disposed at the rear of said frame, means for conveying the stripped material from said stripping means to said hopper, means for driving said stripping mechanism, means including a transverse shaft for driving said conveying means from said mechanism, a generally vertically disposed spike belt in said hopper for separating the ripened cotton, a generally downwardly and rearwardly disposed oscillatory grate mounted in the lower portion of said hopper and adapted to direct the stripped material towards said spike belt, means connected with said shaft for oscillating said grate, doffing means carried in the upper portion of said hopper for removing the ripened cotton from said spike belt and directing the cotton into the rear portion of said hopper, and means also connected with said transverse shaft for driving said doffing means.

16. A harvester for harvesting cotton in which some of the cotton bolls are ripe and some are immature or green, comprising means for stripping the ripe and immature bolls from the cotton plants, means for separating the ripe cotton from the immatured bolls, means disposed a short distance above the separating means for delivering the stripped material thereto by gravity so that the immature bolls will not be injured or opened by contact with the separating means, and receiving means for separately receiving the ripe and immatured bolls.

17. A harvester for harvesting cotton in which some of the cotton bolls are ripe and opened and some are immature or unopened, comprising means for stripping both the ripe and immature bolls from the cotton plants, means for separating trash, sand and the like from the mass of opened and unopened bolls, means for removing the opened cotton from said mass without injuring the unopened bolls, and means for receiving the unopened bolls.

18. A harvester for harvesting cotton in which some of the cotton bolls are ripe and some are immature or green, comprising means for stripping the ripe and immature bolls from the cotton plants, a movable toothed member, means for separating trash, sand and the like from the stripped material and for directing the opened and unopened bolls downwardly by gravity against said movable toothed member so that the unopened bolls will not be injured, said toothed member serving to remove the opened cotton from said mass, and hopper means for receiving said unopened bolls.

19. A harvester for harvesting cotton in which some of the cotton bolls are ripe and some are immature or green, comprising means for stripping the ripe and immature bolls from the cotton plants, a movable toothed member, means for conveying the stripped material from said stripping means toward said toothed member, means associated therewith for removing trash and the like from said stripped material and including a downwardly inclined part conducting both the ripe and immature cotton into contact with said member, means for driving said toothed member to separate the ripe cotton from the green cotton and leaving the latter behind, and means for receiving the green cotton.

FREDERICK A. THOMANN.